Aug. 12, 1930.      E. L. CARLSON           1,772,798
              SPRING PAWL FOR RATCHET MECHANISMS
                     Filed Nov. 2, 1928
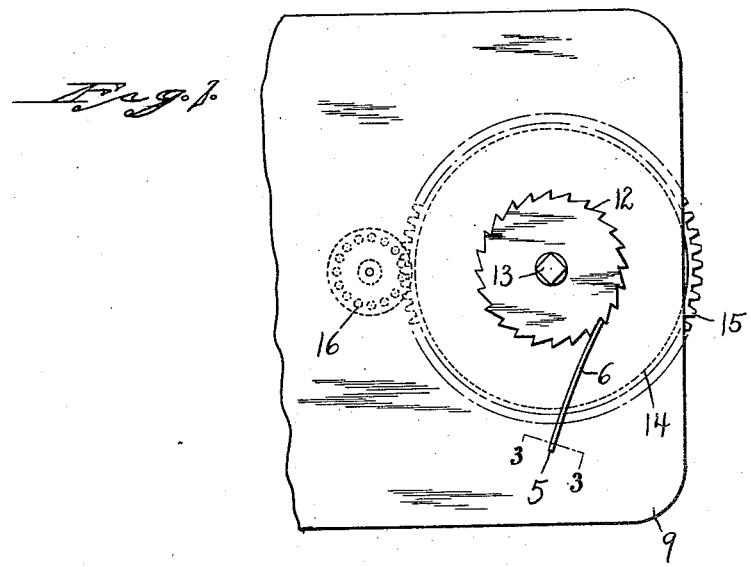
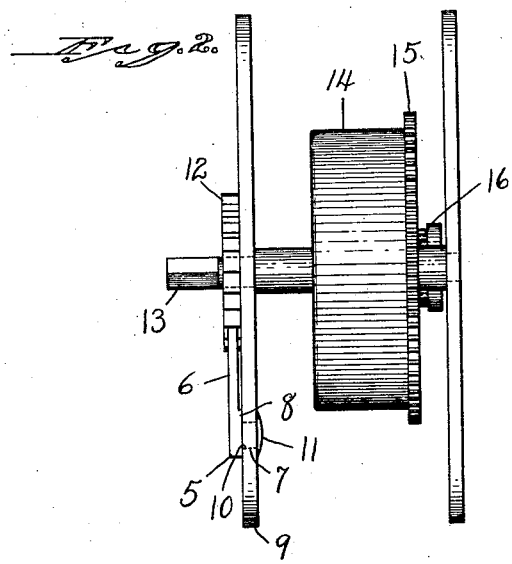
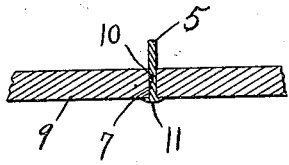
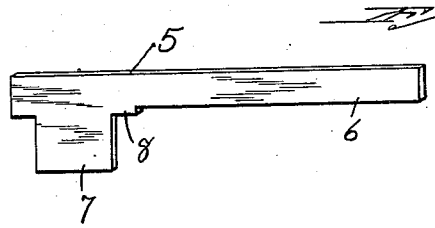

Patented Aug. 12, 1930

1,772,798

UNITED STATES PATENT OFFICE

ELOF L. CARLSON, OF BRISTOL, CONNECTICUT, ASSIGNOR TO THE E. INGRAHAM CO., OF BRISTOL, CONNECTICUT, A CORPORATION

SPRING PAWL FOR RATCHET MECHANISMS

Application filed November 2, 1928. Serial No. 316,665.

My invention relates to an improvement in pawls for ratchet-mechanisms, the object being to produce a one-piece pawl designed to take the place in ratchet-mechanisms of the ordinary pawl, its spring and the pivot upon which it swivels, whereby I secure an economy not only in reducing the number of parts but also in installation.

With this end in view, my invention consists in the combination with a ratchet-wheel, of a mounting-plate formed with an anchoring-opening, and a one-piece spring-pawl comprising a pawl-finger engaging with the teeth of the said ratchet-wheel, and a mounting-tang extending at a right angle to the said finger and adapted to enter the anchoring-opening in the plate.

In the accompanying drawings:

Fig. 1 is a broken view in elevation of my improved one-piece spring pawl as engaged with the ratchet-wheel of a clock-train;

Fig. 2 is an edge view thereof;

Fig. 3 is an enlarged-scale sectional view on the line 3—3 of Fig. 1; and

Fig. 4 is an enlarged-scale detached perspective view of my improved one-piece spring-pawl.

In carrying out my invention, as herein shown, my improved one-piece spring-pawl 5 is blanked from a single piece of sheet-metal and comprises a spring-finger 6, a rectangular anchoring-tang 7 offsetting from the body or hub of the pawl at a right angle to the major axis thereof, and a spacing-shoulder 8 interposed between the inner edge of the finger 6 and the inner edge of the tang 7, such spacing-shoulder being provided to insure the free vibratory action of the spring-finger 6. For mounting this pawl, one of the movement-plates 9 of the clock is formed with a narrow slot 10 for the reception of the said tang 7, the projecting end of which is headed over as at 11, whereby the spring-pawl is firmly held in place in the plate 9. The pawl, as thus shaped and mounted, is adapted in length to successively engage the teeth of an ordinary ratchet-wheel 12 mounted upon the arbor 13 of a main-spring (not shown) enclosed within a barrel 14 carrying a main-wheel 15, which meshes into a lantern-pinion 16 of any clock- or similar train.

I may now explain that the position of the slot 10 with respect to the periphery of the ratchet-wheel 12 is such that the finger 6 of the pawl is sprung enough to be constantly maintained in tensional engagement with the bottoms of the teeth of the ratchet-wheel.

While I have shown my improvement as forming a constituent part of the ratchet-mechanism of a clock, it is obvious that its use is not so limited, but that it may be used in a great variety of kindred situations.

I claim:

In a ratchet-and-pawl mechanism, the combination with a ratchet-wheel, of a mounting-plate extending in a plane parallel with the said ratchet-wheel and formed with an anchoring-opening, and a one-piece sheet-metal spring-pawl comprising a resilient pawl-finger engaging with the teeth of the said ratchet-wheel, and a mounting-tang located in the flatwise plane of, and integral with, the said spring-pawl and offsetting from one edge thereof at a right angle thereto and entered into the said anchoring-opening in the plate and upset upon the opposite face thereof.

In testimony whereof, I have signed this specification.

ELOF L. CARLSON.